United States Patent
Tian et al.

(10) Patent No.: US 10,310,292 B2
(45) Date of Patent: Jun. 4, 2019

(54) CALIBRATION METHOD, CALIBRATION DEVICE AND CALIBRATION SYSTEM FOR HANDHELD GIMBAL

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

(*) Notice: Subject to any disclaimer, the term of this patent is extended or adjusted under 35 U.S.C. 154(b) by 0 days.

(21) Appl. No.: 15/854,799

(22) Filed: Dec. 27, 2017

(65) Prior Publication Data

US 2018/0120585 A1    May 3, 2018

(30) Foreign Application Priority Data

Dec. 30, 2016  (CN) .......................... 2016 1 1270210

(51) Int. Cl.

| | |
|---|---|
| *F16M 13/00* | (2006.01) |
| *F16M 13/04* | (2006.01) |
| *G02B 27/64* | (2006.01) |
| *G03B 17/56* | (2006.01) |
| *G03B 43/00* | (2006.01) |
| *H04W 76/10* | (2018.01) |
| *H04W 88/02* | (2009.01) |
| *G06F 3/0484* | (2013.01) |

(52) U.S. Cl.
CPC .......... *G02B 27/646* (2013.01); *F16M 13/04* (2013.01); *G03B 17/561* (2013.01); *G03B 43/00* (2013.01); *F16M 13/00* (2013.01); *G03B 17/56* (2013.01); *G06F 3/04847* (2013.01); *H04W 76/10* (2018.02); *H04W 88/02* (2013.01)

(58) Field of Classification Search
CPC ....................................................... F16M 13/04
USPC ......................................................... 396/421
See application file for complete search history.

(56) References Cited

U.S. PATENT DOCUMENTS

| | | | |
|---|---|---|---|
| 5,117,246 A * | 5/1992 | Takahashi .............. | G02B 7/102 348/208.99 |
| 6,098,025 A * | 8/2000 | Bae ....................... | G01M 1/122 33/398 |

(Continued)

*Primary Examiner* — Clayton E. LaBalle
*Assistant Examiner* — Kevin C Butler

(57) ABSTRACT

A calibration method, a calibration device and a calibration system for a handheld gimbal are provided. The method includes steps of: establishing a communication connection between a mobile terminal and the handheld gimbal; controlling the mobile terminal to move along a specified displacement direction, and obtaining a motor current value of the handheld gimbal in real-time through the communication connection when the mobile terminal moves along the specified displacement direction; obtaining a motion path of a specified analog object in a graphical interface, wherein a corresponding relation exists between the motion path and the displacement direction of the mobile terminal; controlling the specified analog object to perform an analog displacement along the motion path corresponding to the specified displacement direction according to a change of the motor current value; and, when the specified analog object reaches a specified location area, indicating that calibration of the handheld gimbal is finished.

9 Claims, 6 Drawing Sheets

(56) References Cited

U.S. PATENT DOCUMENTS

| | | | | |
|---|---|---|---|---|
| 6,466,198 B1* | 10/2002 | Feinstein | G06F 1/1626 345/158 |
| 6,798,429 B2* | 9/2004 | Bradski | G06F 1/1626 345/156 |
| 7,301,528 B2* | 11/2007 | Marvit | G06F 1/1626 345/156 |
| 7,397,422 B2* | 7/2008 | Tekawy | G01S 19/53 342/357.36 |
| 7,511,738 B1* | 3/2009 | Kancler | G06T 3/608 348/208.99 |
| 8,994,644 B2* | 3/2015 | Cook | G06F 1/1613 345/156 |
| 9,124,804 B2* | 9/2015 | Kaheel | H04N 1/00127 |
| 9,298,014 B2* | 3/2016 | Luty | G02B 27/644 |
| 9,727,095 B2* | 8/2017 | Vaananen | G06F 1/1626 |
| 9,800,778 B2* | 10/2017 | Haehnichen | H04N 5/23248 |
| 2002/0093483 A1* | 7/2002 | Kaplan | G06F 1/1626 345/158 |
| 2005/0083314 A1* | 4/2005 | Shalit | G06F 1/1626 345/179 |
| 2005/0180740 A1* | 8/2005 | Yokoyama | G06F 1/1626 396/421 |
| 2007/0244638 A1* | 10/2007 | Lee | G01C 21/00 701/533 |
| 2008/0136923 A1* | 6/2008 | Inbar | G02B 27/646 348/208.2 |
| 2008/0221790 A1* | 9/2008 | Min | G01C 21/3647 701/533 |
| 2009/0243930 A1* | 10/2009 | Tien | H01Q 1/1257 342/360 |
| 2012/0038549 A1* | 2/2012 | Mandella | G06F 3/011 345/156 |
| 2012/0062729 A1* | 3/2012 | Hart | G06F 1/1626 348/135 |
| 2013/0179108 A1* | 7/2013 | Joseph | G01D 18/00 702/104 |
| 2013/0243439 A1* | 9/2013 | Ito | H04B 10/40 398/135 |
| 2013/0321391 A1* | 12/2013 | Troy | G06T 15/00 345/419 |
| 2014/0303926 A1* | 10/2014 | Sessego | G01L 25/00 702/104 |
| 2014/0352400 A1* | 12/2014 | Barrilado | B81B 7/008 73/1.38 |
| 2015/0066356 A1* | 3/2015 | Kirsch | G01C 21/3664 701/425 |
| 2015/0298548 A1* | 10/2015 | Maru | G01C 21/3697 715/234 |
| 2016/0098095 A1* | 4/2016 | Gonzalez-Banos | G06F 3/017 345/156 |
| 2018/0120585 A1* | 5/2018 | Tian | G02B 27/646 |

\* cited by examiner

US 10,310,292 B2

CALIBRATION METHOD, CALIBRATION DEVICE AND CALIBRATION SYSTEM FOR HANDHELD GIMBAL

CROSS REFERENCE OF RELATED APPLICATION

The application claims priority under 35 U.S.C. 119(a-d) to CN 201611270210.8, filed Dec. 30, 2016.

BACKGROUND OF THE PRESENT INVENTION

Field of Invention

The present invention relates to a field of handheld gimbal, and more particularly to a calibration method, a calibration device and a calibration system for a handheld gimbal.

Description of Related Arts

With the popularization of the smart mobile terminal, more and more users use the handheld gimbal for shooting of the mobile terminal. The handheld gimbal applies the technology of the automatic steady and coordinated system of the unmanned aerial vehicle into the handheld shooting and is an auxiliary shooting device which is able to keep balance when moving, so as to realize the automatic stable equilibrium during the shooting process. Because the shooting devices have various types, the gravity center position of each shooting device is different, resulting in that the handheld gimbal is difficult to keep balance after the shooting device is arranged on the handheld gimbal, thereby causing the dithering problem when using.

SUMMARY OF THE PRESENT INVENTION

An object of the present invention is to provide a calibration method, a calibration device and a calibration system for a handheld gimbal. Through calibrating the handheld gimbal, the handheld gimbal keeps balance.

The present invention firstly provides a calibration method for a handheld gimbal, comprising steps of: establishing a communication connection between a mobile terminal and the handheld gimbal, wherein the mobile terminal is located on the handheld gimbal and shooting of the mobile terminal is controlled by the handheld gimbal; controlling the mobile terminal to perform a displacement motion along a specified displacement direction, and, when the mobile terminal performs the displacement motion along the specified displacement direction, obtaining a first motor current value of the handheld gimbal in real-time through the communication connection; obtaining a specified motion path of a specified analog object in a predetermined first graphical interface and a corresponding relation between the specified motion path and the specified displacement direction; according to a change of the first motor current value, controlling the specified analog object to perform an analog displacement along the motion path corresponding to the specified displacement direction; and, when the specified analog object reaches a specified first location area, indicating that calibration of the handheld gimbal is finished.

The present invention further provides a calibration device for a handheld gimbal, comprising:

a communication connection module, which is configured to establish a communication connection between a mobile terminal and the handheld gimbal, wherein the mobile terminal is located on the handheld gimbal and shooting of the mobile terminal is controlled by the handheld gimbal;

a first motor current value obtaining module, which is configured to control the mobile terminal to perform a displacement motion along a specified displacement direction and obtain a first motor current value of the handheld gimbal in real-time through the communication connection when the mobile terminal performs the displacement motion along the specified displacement direction;

an analog object motion path obtaining module, which is configured to obtain a specified motion path of a specified analog object in a predetermined first graphical interface and a corresponding relation between the specified motion path and the specified displacement direction;

an analog object analog displacement module, which is configured to control the specified analog object to perform an analog displacement along the motion path corresponding to the specified displacement direction according to a change of the first motor current value; and a calibration result indicating module, which is configured to indicate that calibration of the handheld gimbal is finished when the specified analog object reaches a specified first location area.

The present invention further provides a calibration system for a handheld gimbal, comprising:

a memory, which is configured to store a program;

a processor, which is configured to operate the program stored in the memory and execute steps of: establishing a communication connection between a mobile terminal and the handheld gimbal, wherein the mobile terminal is located on the handheld gimbal and shooting of the mobile terminal is controlled by the handheld gimbal; controlling the mobile terminal to perform a displacement motion along a specified displacement direction, and, when the mobile terminal performs the displacement motion along the specified displacement direction, obtaining a first motor current value of the handheld gimbal in real-time through the communication connection; obtaining a specified motion path of a specified analog object in a predetermined first graphical interface and a corresponding relation between the specified motion path and the specified displacement direction; according to a change of the first motor current value, controlling the specified analog object to perform an analog displacement along the motion path corresponding to the specified displacement direction; and, when the specified analog object reaches a specified first location area, indicating that calibration of the handheld gimbal is finished; and a display, which is configured to display the analog displacement of the analog object in the first graphical interface.

According to the calibration method, the calibration device and the calibration system for the handheld gimbal provided by the present invention, the communication connection between the mobile terminal and the handheld gimbal is established; through the mobile terminal, the motor current value of the handheld gimbal is obtained in real-time; in the predetermined graphical interface, when the analog object reaches the specified location area, namely the motor current value of the handheld gimbal is in a preset current threshold range, the calibration is indicated to be finished.

BRIEF DESCRIPTION OF THE DRAWINGS

In order to illustrate the technical solutions of the preferred embodiments of the present invention more clearly, The accompanying drawings referred in the preferred embodiments are simply described as follows. One skilled in the art can derive other drawings from the accompanying drawings without creative efforts.

DETAILED DESCRIPTION OF THE PREFERRED EMBODIMENT

Features of various aspects and the preferred embodiments of the present invention are illustrated in detail as follows. In order to make objects, technical solutions and advantages of the present invention more apparent, the present invention is further described in detail with the accompanying drawings and the preferred embodiments. It should be understood that the preferred embodiments are provided merely for illustrating the present invention, not for limiting the present invention. One skilled in the art can implement the present invention with omitting some specific details. The following description of the preferred embodiments is merely for providing some examples of the present invention, so as to provide a better understanding of the present invention.

It is noted that: in the text, the relation terms such as "first" and "second" are merely for separating one entity or operation from another entity or operation, not for requesting or implying any relation or sequence between the entities or operations. Moreover, the terms such as "include" and "comprise" and any other variants mean the non-exclusive inclusion, so that the process, method, object or device including a series of elements not only includes the illustrated elements, but also includes other elements which are not specifically listed or the inherent elements of the process, method, object or device. At a condition without more limitations, the term "comprising . . . " includes the limited elements and does not exclude other elements from the process, method, object or device including the limited elements.

A calibration method, a calibration device and a calibration system for a handheld gimbal are provided by the present invention for keeping the handheld gimbal on which a mobile terminal is arranged in balance as much as possible, and for decreasing motor power. Thus, a main idea of the present invention is to judge whether the handheld gimbal on which the mobile terminal is arranged is in balance through judging whether a motor current value is in a preset current threshold range, and then through calibrating the handheld gimbal, enable the motor current value to be in the preset current threshold range, so that the gimbal is in balance.

With the accompanying drawings, the calibration method, the calibration device and the calibration system for the handheld gimbal are described in detail as follows.

First Preferred Embodiment

Figure 1:
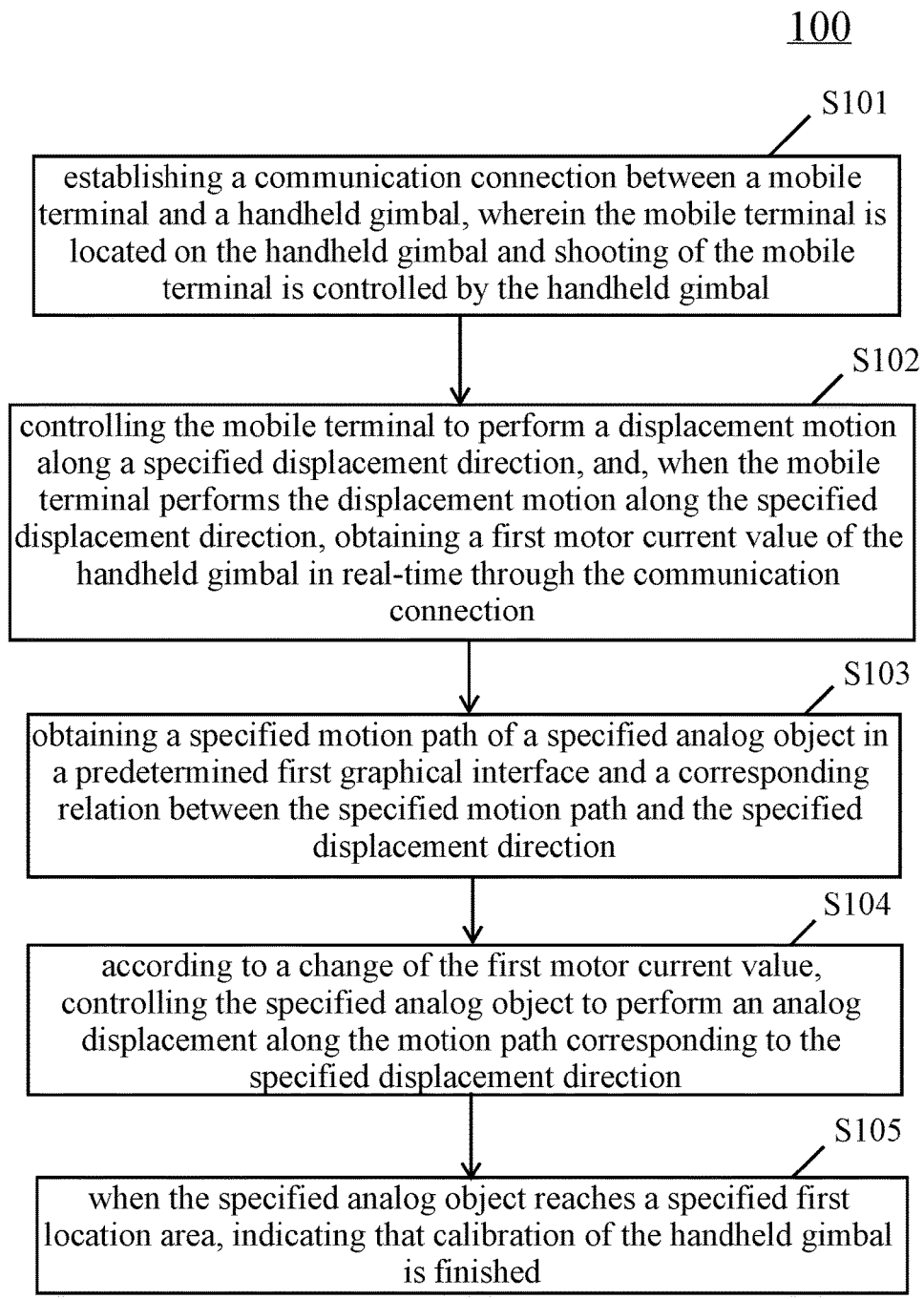
FIG. 1 is a flow chart of a calibration method for a handheld gimbal according to a first preferred embodiment of the present invention.

FIG. 1 shows a flow chart of a calibration method for a handheld gimbal provided by the first preferred embodiment of the present invention.

As shown in FIG. 1, the calibration method 100 for the handheld gimbal comprises steps of:

S101, establishing a communication connection between a mobile terminal and the handheld gimbal, wherein the mobile terminal is located on the handheld gimbal and shooting of the mobile terminal is controlled by the handheld gimbal;

S102, controlling the mobile terminal to perform a displacement motion along a specified displacement direction, and, when the mobile terminal performs the displacement motion along the specified displacement direction, obtaining a first motor current value of the handheld gimbal in real-time through the communication connection;

S103, obtaining a specified motion path of a specified analog object in a predetermined first graphical interface and a corresponding relation between the specified motion path and the specified displacement direction;

S104, according to a change of the first motor current value, controlling the specified analog object to perform an analog displacement along the motion path corresponding to the specified displacement direction; and S105, when the specified analog object reaches a specified first location area, indicating that calibration of the handheld gimbal is finished.

According to the calibration method for the handheld gimbal provided by the first preferred embodiment, after establishing the communication connection between the mobile terminal and the handheld gimbal, the mobile terminal is controlled to perform the displacement motion along the specified displacement direction, so as to obtain the first motor current value of the handheld gimbal in the specified displacement direction; the graphical interface is for displaying and guiding the adjustment process, and indicating that the calibration of the handheld gimbal is finished when the specified analog object reaches the specified first location area. Through the calibration method provided by the first preferred embodiment, it is convenient for the user to calibrate the handheld gimbal, the operation is easy, and the calibration process is simple and clear.

In the step of S101, the communication connection between the mobile terminal and the handheld gimbal can be one of a wired connection, a Bluetooth communication connection, a wireless internet communication connection and an infrared communication connection.

In the step of S102, through the displacement motion of the mobile terminal in the specified displacement direction, a Roll axis or a Pitch axis of the handheld gimbal is adjusted.

In the step of S103, the predetermined first graphical interface can be a graphical interface established in a mobile phone terminal arranged on the handheld gimbal; during the calibration process, the displacement motion of the mobile phone terminal leads to the change of the obtained motor current value; and, in the established graphical interface of the mobile phone terminal, the analog displacement of the analog object in the graphic interface supports the change of the motor current value.

Particularly, the specified displacement direction comprises a first displacement direction and/or a second displacement direction; the specified motion path comprises a first motion path corresponding to the first displacement direction, and/or a second motion path corresponding to the second displacement direction; the first motor current value comprises a first displacement direction motor current value corresponding to the first displacement direction and/or a second displacement direction motor current value corresponding to the second displacement direction; the first motion path comprises a current value increasing direction corresponding to the motor current value in the first displacement direction, and the second motion path comprises a current value increasing direction corresponding to the motor current value in the second displacement direction; the first motion path and the second motion path are arranged in the first graphic interface crosswise; a mapping relation exists between a center radius of the first location area and a preset first current threshold of the motor current value; and a center of the first location area is an intersection of the first motion path and the second motion path.

Particularly, the specified displacement direction can be the first displacement direction or the second displacement direction of the mobile phone terminal, which respectively represent the adjustment of the Roll axis or the Pitch axis of the handheld gimbal.

In the predetermined first graphic interface, operation instructions of how the mobile phone terminal performs the displacement motion are provided to the operator of the handheld gimbal who calibrates the handheld gimbal in the predetermined first graphic interface. For example, when the operator calibrates the handheld gimbal and faces the first graphic interface, the interface indicates that the user can calibrate the Roll axis of the handheld gimbal through moving the mobile phone terminal leftwards and rightwards, and can calibrate the Pitch axis of the handheld gimbal through moving the mobile phone terminal forwards and backwards.

When calibrating the handheld gimbal, if the obtained motor current value in one of the Roll axis and Pitch axis of the handheld gimbal is in a range of the first current threshold of the motor current value, it is merely required to obtain the motor current value of the other axis, so as to calibrate the handheld gimbal; if both of the motor current values corresponding to the Roll axis and the Pitch axis are not in the first current threshold range of the motor current value, it is required to respectively obtain the motor current values on the Roll axis and the Pitch axis, so as to calibrate the handheld gimbal.

For the mapping relation between the center radius of the first location area and the preset first current threshold of the motor current value, as an example, twenty length units of the center radius of the first location area represent the range of the first current threshold of the motor current value.

If the motor current values on the Roll axis and the Pitch axis are required to be respectively obtained for calibrating the handheld gimbal, in the first graphic interface, the specified analog object comprises a first analog object and a second analog object, wherein the first analog object performs an analog displacement in the first motion path and the second analog object performs an analog displacement in the second motion path; and in the step of S205, when both of the analog displacements of the first analog object and the second analog object reach the first location area, the calibration of the handheld gimbal is indicated to be finished.

That is to say, when both of the motor current values on the Roll axis and the Pitch axis of the handheld gimbal are in the preset threshold range of the current value, the first graphic interface indicates to the user of the mobile terminal that the calibration is finished.

A choice of the analog object in the graphic interface is not limited, so long as the specified analog object is able to perform the analog displacement.

For example, the analog object can be a bubble or a small ball.

In other preferred embodiments, if the handheld gimbal has a balancing weight, a position and/or a size of the balancing weight of the handheld gimbal is also required to be adjusted.

Second Preferred Embodiment

Figure 2:
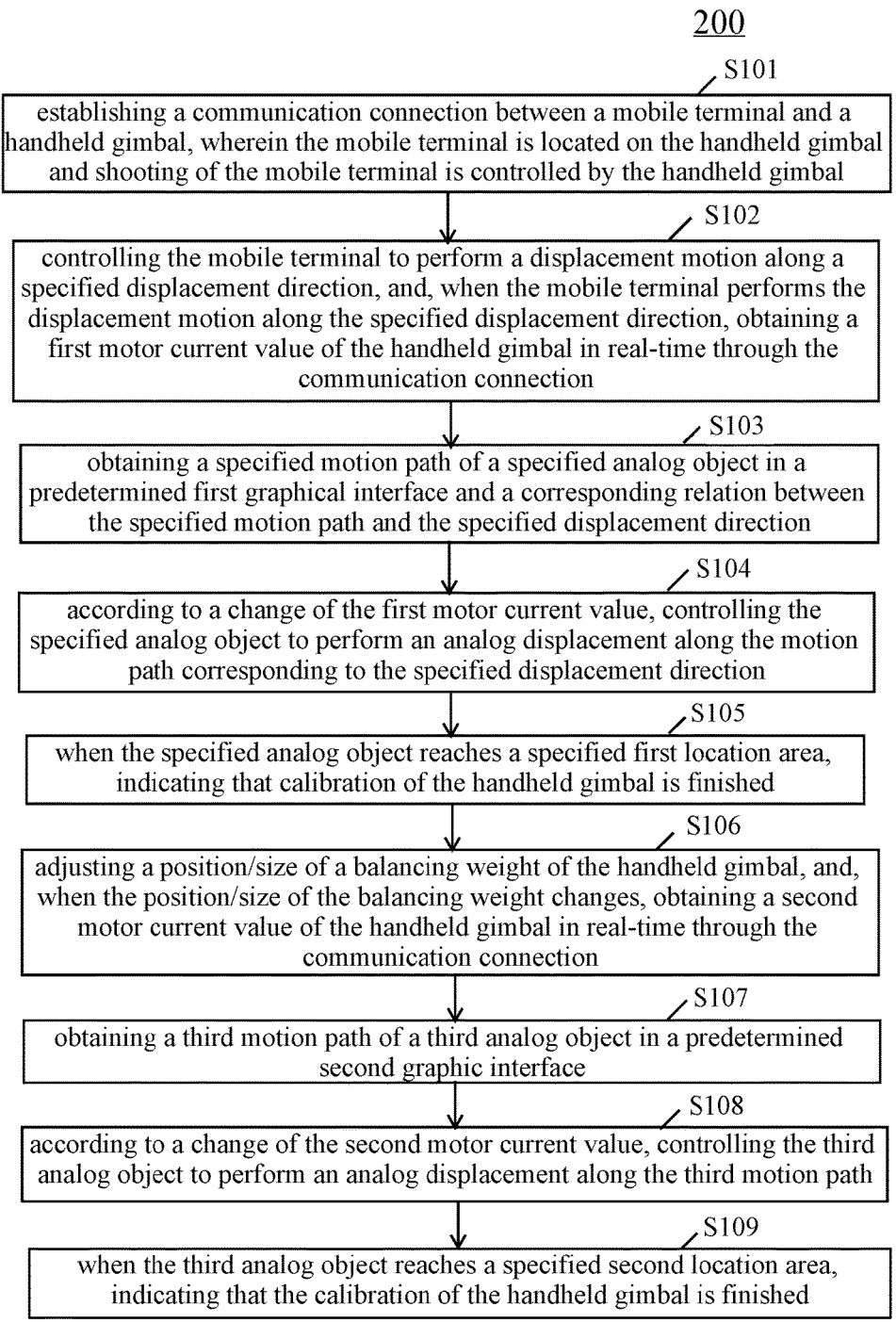
FIG. 2 is a flow chart of a calibration method for a handheld gimbal according to a second preferred embodiment of the present invention.

A calibration method for a handheld gimbal provided by the second preferred embodiment is described with FIG. 2 as follows. FIG. 2 is a flow chart of the calibration method for the handheld gimbal according to the second preferred embodiment of the present invention. The same or equivalent steps are represented by the same reference character in FIGS. 1-2. Steps in FIG. 2 are basically same as steps in FIG. 1 and are different in that the calibration method 200 for the handheld gimbal shown in FIG. 2 further comprises steps of:

S106, adjusting a position/size of a balancing weight of the handheld gimbal, and, when the position/size of the balancing weight changes, obtaining a second motor current value of the handheld gimbal in real-time through the communication connection;

S107, obtaining a third motion path of a specified third analog object in a predetermined second graphic interface;

S108, according to a change of the second motor current value, controlling the third analog object to perform an analog displacement along the third motion path; and S109, when the third analog object reaches a specified second location area, indicating that calibration of the handheld gimbal is finished.

The motion path of the third analog object comprises a current value increasing direction corresponding to the second motor current value; and a mapping relation exists between a center radius of the second location area and the preset first current threshold of the motor current value.

The analog displacement of the first analog object in the first motion path, the analog displacement of the second analog object in the second motion path and the analog displacement of the third analog object in the third motion path comprise a maximum displacement limiting value; and a mapping relation exists between the maximum displacement limiting value and a preset second current threshold of the motor current value.

As an example, a hundred length units of the center radius of the first location area represent a range of the second current threshold of the motor current value.

According to the calibration method for the handheld gimbal provided by the second preferred embodiment, three axes of the handheld gimbal are respectively calibrated according to an actual condition, so that the motor current value is in the first current threshold range of the motor current value and the gimbal keeps balance.

According to the second preferred embodiment, in order to instruct the calibration process more stably, the analog displacement of the analog object in the predetermined graphic interface can be processed with smoothing.

Third Preferred Embodiment

Figure 3:
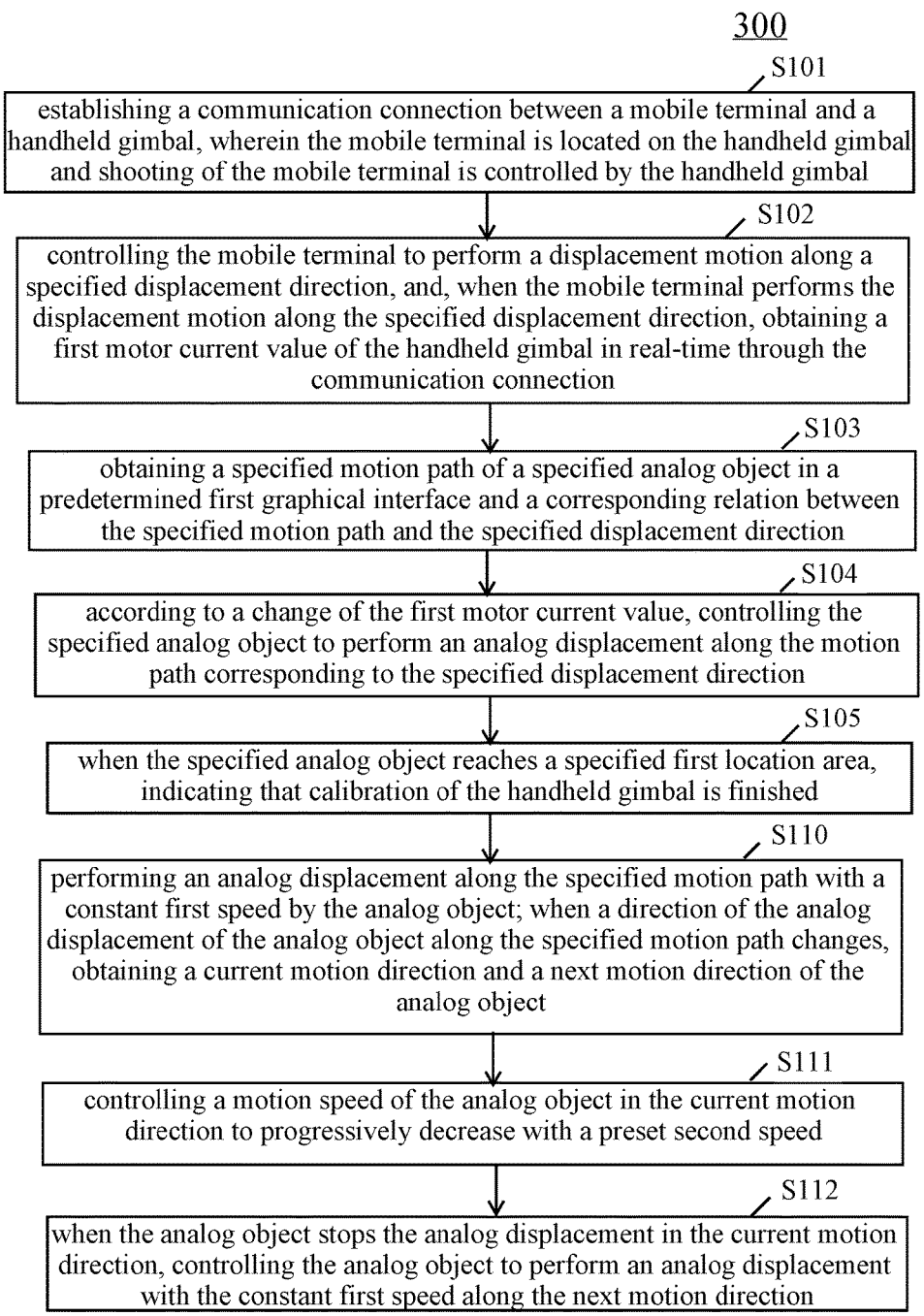
FIG. 3 is a flow chart of a calibration method for a handheld gimbal according to a third preferred embodiment of the present invention.

FIG. 3 shows a flow chart of a calibration method for a handheld gimbal provided by the third preferred embodiment. The same or equivalent steps are represented by the same reference character in FIG. 1 and FIG. 3. Steps in FIG. 3 are basically same as steps in FIG. 1 and are different in that the calibration method 300 for the handheld gimbal shown in FIG. 3 further comprises steps of:

S110, performing an analog displacement along the specified motion path with a constant first speed by the analog object; when a direction of the analog displacement of the analog object along the specified motion path changes, obtaining a current motion direction and a next motion direction of the analog object;

S111, controlling a motion speed of the analog object in the current motion direction to progressively decrease with a preset second speed; and S112, when the analog object stops the analog displacement in the current motion direction, controlling the analog object to perform an analog displacement with the constant first speed along the next motion direction.

Through the above steps of S110-S112, the analog displacement of the analog object in the graphic interface is processed with smoothing, which effectively reduces the image dithering caused by the change of the obtained motor current value, increases an indication effect of the calibration of the graphic interface, and enables the user of the mobile phone terminal to obtain a good user experience.

Fourth Preferred Embodiment

With accompanying drawings, a calibration device for a handheld gimbal provided by the fourth preferred embodiment is described.

Figure 4:
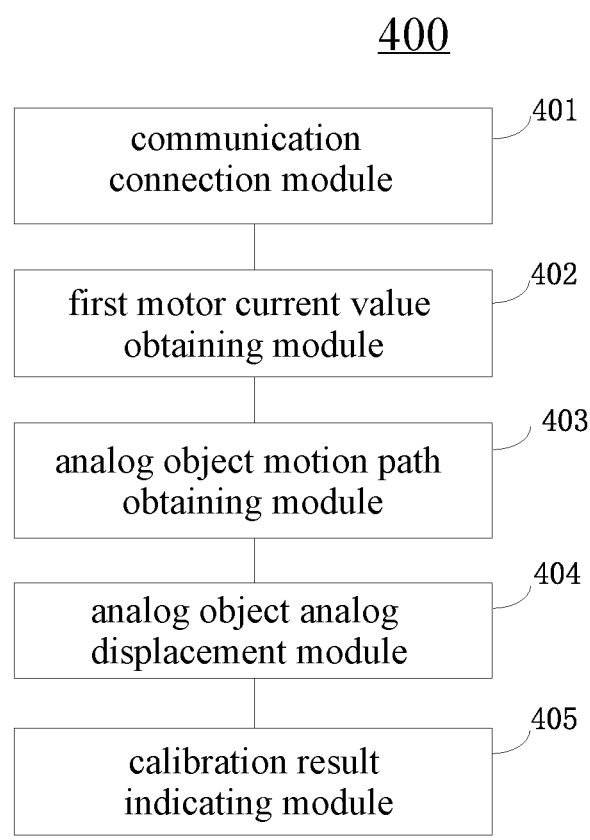
FIG. 4 is a sketch view of a calibration device for a handheld gimbal according to a fourth preferred embodiment of the present invention.

FIG. 4 is a sketch view of the calibration device for the handheld gimbal according to the fourth preferred embodiment. As shown in FIG. 4, the calibration device 400 for the handheld gimbal comprises:

a communication connection module 401, which is configured to establish a communication connection between a mobile terminal and the handheld gimbal, wherein the mobile terminal is located on the handheld gimbal and shooting of the mobile terminal is controlled by the handheld gimbal;

a first motor current value obtaining module 402, which is configured to control the mobile terminal to perform a displacement motion along a specified displacement direction and obtain a first motor current value of the handheld gimbal in real-time through the communication connection when the mobile terminal performs the displacement motion along the specified displacement direction;

an analog object motion path obtaining module 403, which is configured to obtain a specified motion path of a specified analog object in a predetermined first graphical interface and a corresponding relation between the specified motion path and the specified displacement direction;

an analog object analog displacement module 404, which is configured to control the specified analog object to perform an analog displacement along the motion path corresponding to the specified displacement direction according to a change of the first motor current value; and a calibration result indicating module 405, which is configured to indicate that calibration of the handheld gimbal is finished when the specified analog object reaches a specified first location area.

According to the calibration device for the handheld gimbal provided by the fourth preferred embodiment of the present invention, the mobile terminal arranged on the handheld gimbal is controlled to perform the displacement motion along the specified displacement direction, so as to obtain the first motor current value of the handheld gimbal; and through the graphic interface, the adjustment process is displayed and guided. Through the calibration device provided by the fourth preferred embodiment, the operation is easy, and the calibration process is simple and clear.

The communication connection in the communication connection module comprises a wired connection, a Bluetooth communication connection, a wireless internet communication connection and an infrared communication connection.

In the predetermined first graphic interface, the specified displacement direction comprises a first displacement direction and/or a second displacement direction; the specified motion path comprises a first motion path corresponding to the first displacement direction, and/or a second motion path corresponding to the second displacement direction; the first motor current value comprises a first displacement direction motor current value corresponding to the first displacement direction and/or a second displacement direction motor current value corresponding to the second displacement direction; the first motion path comprises a current value increasing direction corresponding to the motor current value in the first displacement direction, and the second motion path comprises a current value increasing direction corresponding to the motor current value in the second displacement direction; the first motion path and the second motion path are arranged in the first graphic interface crosswise; a mapping relation exists between a center radius of the first location area and a preset first current threshold of the motor current value; and a center of the first location area is an intersection of the first motion path and the second motion path.

If the Roll axis and the Pitch axis are both required to be calibrated, in the first predetermined graphic interface, the specified analog object comprises a first analog object and a second analog object, wherein the first analog object performs an analog displacement in the first motion path and the second analog object performs an analog displacement in the second motion path; and the calibration result indicating module 405 is also configured to indicate that the calibration of the handheld gimbal is finished when both of the analog displacements of the first analog object and the second analog object reach the first location area.

Fifth Preferred Embodiment

Figure 5:
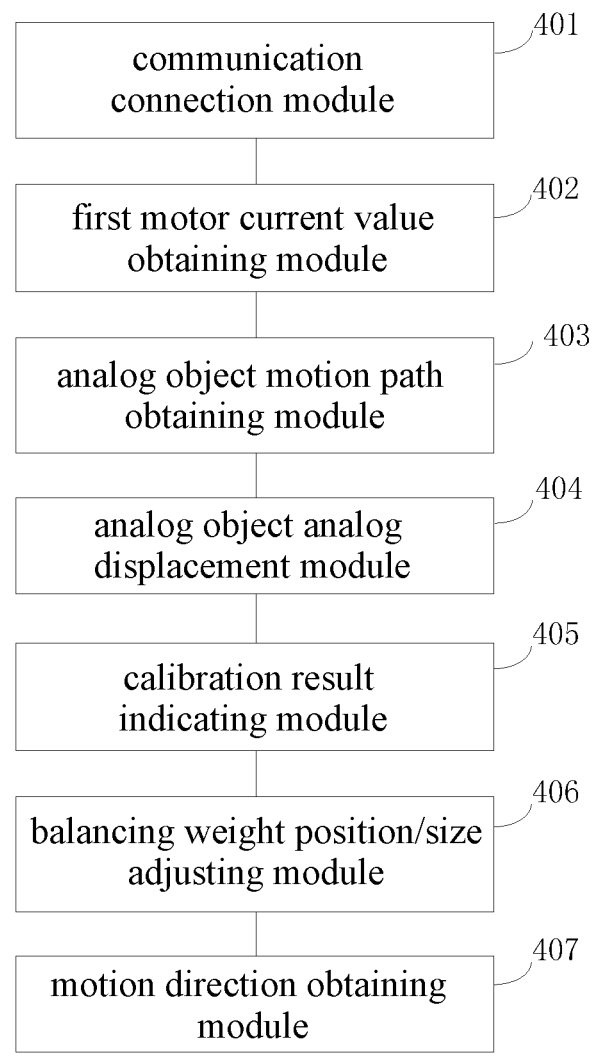
FIG. 5 is a sketch view of a calibration device for a handheld gimbal according to a fifth preferred embodiment of the present invention.

FIG. 5 is a sketch view of a calibration device for a handheld gimbal according to the fifth preferred embodiment of the present invention. The calibration device shown in FIG. 5 is different from the calibration device shown in FIG. 4 in that the calibration device 500 for the handheld gimbal further comprises:

a balancing weight position/size adjusting module 406, which is configured to adjust a position/size of a balancing weight of the handheld gimbal, and obtain a second motor current value of the handheld gimbal in real-time through the communication connection when the position/size of the balancing weight changes.

The analog object motion path obtaining module 403 is further configured to obtain a third motion path of a specified third analog object in a predetermined second graphic interface;

the analog object analog displacement module 404 is further configured to control the third analog object to perform an analog displacement along the third motion path according to a change of the second motor current value; and the calibration result indicating module 405 is further configured to indicate that the calibration of the handheld gimbal is finished when the third analog object reaches a specified second location area.

According to the fifth preferred embodiment, the second graphic interface is provided for indicating an adjustment of the position/size of the balancing weight of the handheld gimbal.

In the second graphic interface, the motion path of the third analog object comprises a current value increasing direction corresponding to the second motor current value; and a mapping relation exists between a center radius of the second location area and the preset first current threshold of the motor current value.

The analog displacement of the first analog object in the first motion path, the analog displacement of the second analog object in the second motion path and the analog displacement of the third analog object in the third motion path comprise a maximum displacement limiting value; and a mapping relation exists between the maximum displacement limiting value and a preset second current threshold of the motor current value.

According to the above calibration device for the handheld gimbal, three axes of the handheld gimbal are respectively calibrated according to an actual condition, so that the motor current value is in a range of the first current threshold of the motor current value and the gimbal keeps balance.

Referring to FIG. 5, the calibration device 500 for the handheld gimbal further comprises:

a motion direction obtaining module 407, wherein: the analog object initially performs the analog displacement along the specified motion path with a constant first speed; and, when a direction of the analog displacement of the analog object along the specified motion path changes, the motion direction obtaining module is configured to obtain a current motion direction and a next motion direction of the analog object.

The analog object analog displacement module is further configured to control a motion speed of the analog object in the current motion direction to progressively decrease with a preset second speed, and control the analog object to perform an analog displacement with the constant first speed along the next motion direction when the analog object stops the analog displacement in the current motion direction.

Through the calibration device for the handheld gimbal provided by the fifth preferred embodiment, when data of the obtained motor current value has dithering, the analog displacement of the corresponding analog object is processed with smoothing, so that the indication of the calibration process in the graphic interface becomes more smooth and stable.

Other details of the calibration device for the handheld gimbal provided by the fifth preferred embodiment are similar as that of the calibration method described with FIGS. 1-3 and not repeated again.

Sixth Preferred Embodiment

Figure 6:
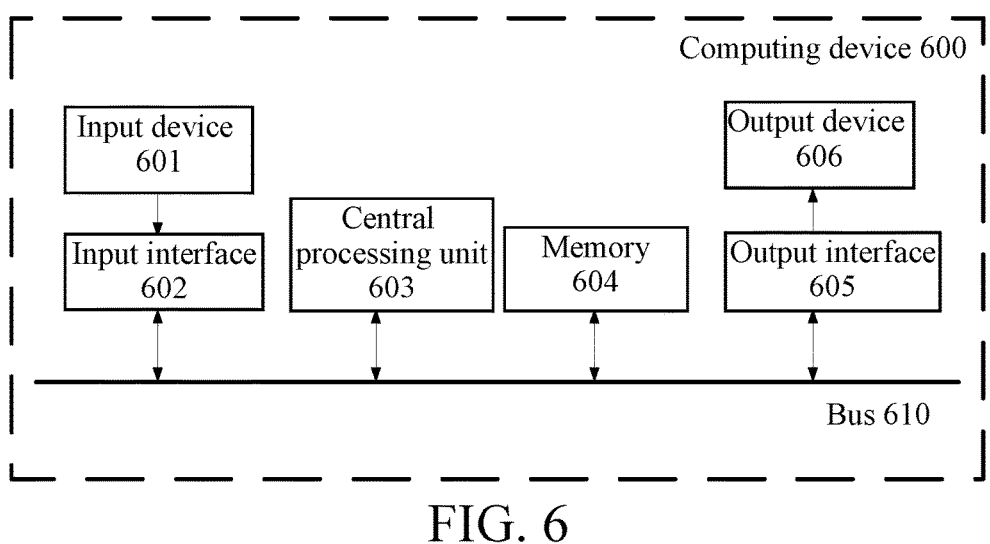
FIG. 6 is a sketch view of a hardware structure of a calibration system for a handheld gimbal according to a sixth preferred embodiment of the present invention.

The calibration method and the calibration device for the handheld gimbal provided by the above preferred embodiments with FIGS. 1-5 can be realized through a calibration system for the handheld gimbal. FIG. 6 is a sketch view of a hardware structure of the calibration system for the handheld gimbal according to the sixth preferred embodiment.

As shown in FIG. 6, a computing device 600 comprises: an input device 601, an input interface 602, a central processing unit 603, a memory 604, an output interface 605 and an output device 606, wherein: the input interface 602, the central processing unit 603, the memory 604 and the output interface 605 are connected with each other through a bus 610; the input device 601 and the output device 606 are connected with the bus 610 respectively through the input interface 602 and the output interface 605, so as to connect with other parts of the computing device 600. Particularly, the input device 601 receives input information from an exterior of the computing device, and then transmits the input information to the central processing unit 603 through the input interface 602; the central processing unit 603 processes the input information based on a computer executable instruction stored in the memory 604 and generates output information, then stores the output information temporarily or permanently in the memory 604, and transmits the output information to the output device 606 such as a display through the output interface 605; and, the output device 606 outputs the output information to the exterior of the computing device 600 for the users.

The computing device can be realized as the calibration system for the handheld gimbal; that is to say, it is feasible that the calibration system for the handheld gimbal comprises:

a memory, which is configured to store a program;

a processor, which is configured to operate the program stored in the memory and execute steps of: establishing a communication connection between a mobile terminal and the handheld gimbal, wherein the mobile terminal is located on the handheld gimbal and shooting of the mobile terminal is controlled by the handheld gimbal; controlling the mobile terminal to perform a displacement motion along a specified displacement direction, and obtaining a first motor current value of the handheld gimbal in real-time through the communication connection when the mobile terminal performs the displacement motion along the specified displacement direction; obtaining a specified motion path of a specified analog object in a predetermined first graphical interface and a corresponding relation between the specified motion path and the specified displacement direction; controlling the specified analog object to perform an analog displacement along the motion path corresponding to the specified displacement direction according to a change of the first motor current value; and, when the specified analog object reaches a specified first location area, indicating that calibration of the handheld gimbal is finished; and a display, which is configured to display the analog displacement of the analog object in the first graphical interface.

Through the calibration system for the handheld gimbal provided by the sixth preferred embodiment, the handheld gimbal on which the mobile terminal is arranged is calibrated, so that the handheld gimbal keeps balance.

It is noted that the present invention is not limited to the specific configuration and processing which are described above and shown in figures. For brief description, the detailed description about the conventional methods is omitted. In the above preferred embodiment, the specific steps are described and showed as an example. However, the process of the method provided by the present invention is not limited to the above described and showed specific steps. One skilled in the art can make various changes, modifications and additions, or change a sequence of the steps based on the spirit of the present invention.

The functional modules shown in the sketch views can be the hardware, software, firmware or the combination thereof. When being realized by means of hardware, the modules can be the electronic circuit, application specific integrated circuit (ASIC), appropriate firmware, plug-in, function card and so on. When being realized by means of software, the elements of the present invention can be the program or code segment for executing the required task. The program or the code segment can be stored in the machine-readable medium or be transmitted in the transmission medium or the communication link through the data signal in the carrier wave. The machine-readable medium comprises every medium can store or transmit the information. For example, the machine-readable medium can be the electronic circuit, semiconductor memory device, read-only memory (ROM), flash memory, erasable read-only memory (EROM), soft disk, CD-ROM, light disk, hard disk, fiber medium, and radio frequency (RF) link. The code segment can be downloaded from the computer network such as the Internet and Intranet.

It is further noted that: the preferred embodiments of the present invention are based on a series of steps, the device describing some methods, or the system; but the present invention is not limited to the above-described steps. That is to say, the present invention can be implemented with the above-mentioned sequence of the steps in the preferred embodiments and can also with the different sequence; and, it is also feasible that a plurality of steps are executed at the same time.

One skilled in the art can understand that the above preferred embodiments of the present invention are exemplary only. For convenient and brief description, the specific working process of the above-described system, modules and units can refer to the corresponding process in the former preferred embodiments and not repeated again. It should be understood that the protection scope of the present invention is not limited to the above description. One skilled in the art can easily make various equivalent modifications and replacements encompassed in the disclosed technical scope of the present invention, and the various modifications or replacements are all included in the protection scope of the present invention.

What is claimed is:

1. A calibration method for a handheld gimbal, comprising steps of:
   establishing a communication connection between a mobile terminal and the handheld gimbal, wherein the mobile terminal is located on the handheld gimbal and shooting of the mobile terminal is controlled by the handheld gimbal;
   controlling the mobile terminal to perform a displacement motion along a specified displacement direction, and, when the mobile terminal performs the displacement motion along the specified displacement direction, obtaining a first motor current value of the handheld gimbal in real-time through the communication connection;
   obtaining a specified motion path of a specified analog object in a predetermined first graphical interface and a corresponding relation between the specified motion path and the specified displacement direction;
   according to a change of the first motor current value, controlling the specified analog object to perform an analog displacement along the motion path corresponding to the specified displacement direction; and
   when the specified analog object reaches a specified first location area, indicating that calibration of the handheld gimbal is finished;
   wherein:
   the communication connection comprises a wired connection, a Bluetooth communication connection, a wireless internet communication connection and an infrared communication connection;
   the specified displacement direction comprises a first displacement direction and/or a second displacement direction;
   the specified motion path comprises a first motion path corresponding to the first displacement direction, and/or a second motion path corresponding to the second displacement direction;
   the first motor current value comprises a first displacement direction motor current value corresponding to the first displacement direction and/or a second displacement direction motor current value corresponding to the second displacement direction;
   the first motion path comprises a current value increasing direction corresponding to the motor current value in the first displacement direction, and the second motion path comprises a current value increasing direction corresponding to the motor current value in the second displacement direction; and
   the first motion path and the second motion path are arranged in the first graphic interface crosswise; a mapping relation exists between a center radius of the first location area and a preset first current threshold of the motor current value; and a center of the first location area is an intersection of the first motion path and the second motion path.

2. The calibration method, as recited in claim 1, wherein:
   the specified analog object comprises a first analog object and a second analog object, wherein the first analog object performs an analog displacement in the first motion path and the second analog object performs an analog displacement in the second motion path; and
   the calibration method further comprises steps of: when both of the analog displacements of the first analog object and the second analog object reach the first location area, indicating that the calibration of the handheld gimbal is finished.

3. The calibration method, as recited in claim 2, wherein: the analog displacement of the first analog object in the first motion path, the analog displacement of the second analog object in the second motion path and an analog displacement of a third analog object in a third motion path comprise a maximum displacement limiting value; and a mapping relation exists between the maximum displacement limiting value and a preset second current threshold of the motor current value.

4. The calibration method, as recited in claim 1, wherein the calibration method for the handheld gimbal further comprises steps of:
   adjusting a position/size of a balancing weight of the handheld gimbal, and, when the position/size of the balancing weight changes, obtaining a second motor current value of the handheld gimbal in real-time through the communication connection;
   obtaining a third motion path of a specified third analog object in a predetermined second graphic interface;
   according to a change of the second motor current value, controlling the third analog object to perform an analog displacement along the third motion path; and
   when the third analog object reaches a specified second location area, indicating that the calibration of the handheld gimbal is finished.

5. The calibration method, as recited in claim 4, wherein:
   the motion path of the third analog object comprises a current value increasing direction corresponding to the second motor current value; and a mapping relation exists between a center radius of the second location area and the preset first current threshold of the motor current value.

6. The calibration method, as recited in claim 5, wherein: the analog displacement of the first analog object in the first motion path, the analog displacement of the second analog object in the second motion path and the analog displacement of the third analog object in the third motion path comprise a maximum displacement limiting value; and a mapping relation exists between the maximum displacement limiting value and a preset second current threshold of the motor current value.

7. The calibration method, as recited in claim 1, wherein: the analog object initially performs the analog displacement along the specified motion path with a constant first speed; and, when a direction of the analog displacement of the analog object along the specified motion path changes, the calibration method further comprises steps of:
obtaining a current motion direction and a next motion direction of the analog object;
controlling a motion speed of the analog object in the current motion direction to progressively decrease with a preset second speed; and
when the analog object stops the analog displacement in the current motion direction, controlling the analog object to perform an analog displacement with the constant first speed along the next motion direction.

8. A calibration device for a handheld gimbal, comprising:
a communication connection module, which is configured to establish a communication connection between a mobile terminal and the handheld gimbal, wherein the mobile terminal is located on the handheld gimbal and shooting of the mobile terminal is controlled by the handheld gimbal;
a first motor current value obtaining module, which is configured to control the mobile terminal to perform a displacement motion along a specified displacement direction and obtain a first motor current value of the handheld gimbal in real-time through the communication connection when the mobile terminal performs the displacement motion along the specified displacement direction;
an analog object motion path obtaining module, which is configured to obtain a specified motion path of a specified analog object in a predetermined first graphical interface and a corresponding relation between the specified motion path and the specified displacement direction;
an analog object analog displacement module, which is configured to control the specified analog object to perform an analog displacement along the motion path corresponding to the specified displacement direction according to a change of the first motor current value; and
a calibration result indicating module, which is configured to indicate that calibration of the handheld gimbal is finished when the specified analog object reaches a specified first location area;
wherein:
the communication connection in the communication connection module comprises a wired connection, a Bluetooth communication connection, a wireless internet communication connection and an infrared communication connection;
the calibration device further comprises a balancing weight position/size adjusting module, which is configured to adjust a position/size of a balancing weight of the handheld gimbal, and obtain a second motor current value of the handheld gimbal in real-time through the communication connection when the position/size of the balancing weight changes;
the analog object motion path obtaining module is further configured to obtain a third motion path of a specified third analog object in a predetermined second graphic interface;
the analog object analog displacement module is further configured to control the third analog object to perform an analog displacement along the third motion path according to a change of the second motor current value; and
the calibration result indicating module is further configured to indicate that the calibration of the handheld gimbal is finished when the third analog object reaches a specified second location area.

9. The calibration device, as recited in claim 8, wherein: the analog object initially performs the analog displacement along the specified motion path with a constant first speed; and, when a direction of the analog displacement of the analog object along the specified motion path changes, the calibration device further comprises:
a motion direction obtaining module, which is configured to obtain a current motion direction and a next motion direction of the analog object; and
the analog object analog displacement module is further configured to control a motion speed of the analog object in the current motion direction to progressively decrease with a preset second speed, and control the analog object to perform an analog displacement with the constant first speed along the next motion direction when the analog object stops the analog displacement in the current motion direction.

* * * * *